United States Patent [19]

Newberry et al.

[11] Patent Number: 4,679,599
[45] Date of Patent: Jul. 14, 1987

[54] SAFETY HOSE

[75] Inventors: Mark A. Newberry, Lakewood; Dennis C. Kemper, Aurora, both of Colo.

[73] Assignee: The Gates Rubber Company, Denver, Colo.

[21] Appl. No.: 700,144

[22] Filed: Feb. 8, 1985

[51] Int. Cl.⁴ .............................................. F16L 55/00
[52] U.S. Cl. ....................................... 138/104; 138/124; 138/125; 138/126; 138/178; 138/28; 139/387 R
[58] Field of Search ............... 138/123, 124, 125, 126, 138/27, 28, 137, 104, 177, 178, 172, 174; 139/387 R

[56] References Cited

U.S. PATENT DOCUMENTS

| | | | |
|---|---|---|---|
| 486,621 | 11/1892 | Stowe | 138/124 X |
| 2,230,723 | 2/1941 | MacLachlan | 138/126 X |
| 3,253,618 | 5/1966 | Cook | 138/125 |
| 3,682,202 | 8/1972 | Buhrmann et al. | 138/126 |
| 4,025,684 | 5/1977 | Neidhardt | 139/387 R X |
| 4,091,063 | 5/1978 | Logan | 138/126 X |

Primary Examiner—James E. Bryant, III
Attorney, Agent, or Firm—H. W. Oberg, Jr.; C. H. Castleman, Jr.; F. P. Grassler

[57] ABSTRACT

A safety hose having a stretchable elastomeric tube and cover that sandwich a twined reinforcement that exhibits a circumferential reinforcement component and a weaker longitudinal reinforcement component that breaks when the hose is stretched.

6 Claims, 6 Drawing Figures

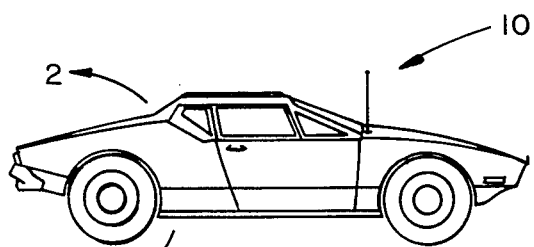
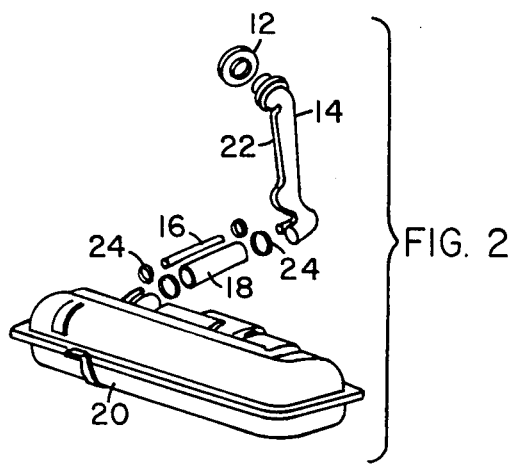
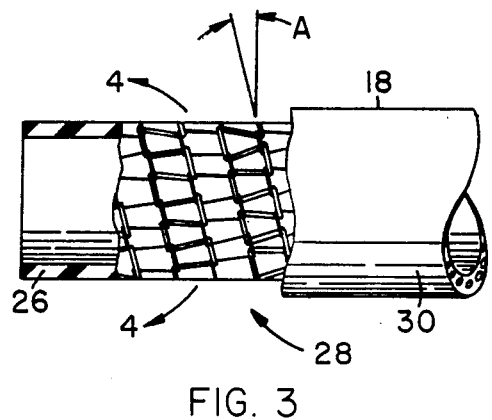
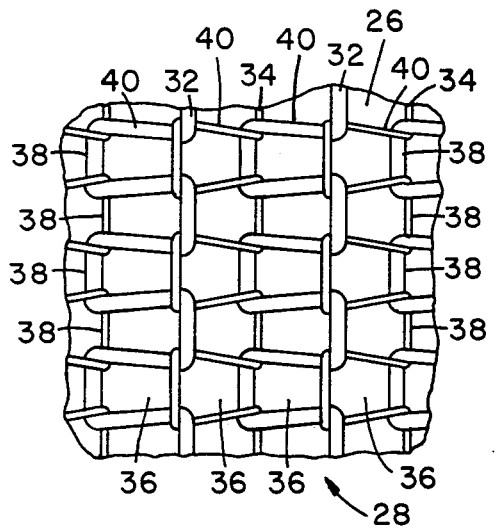
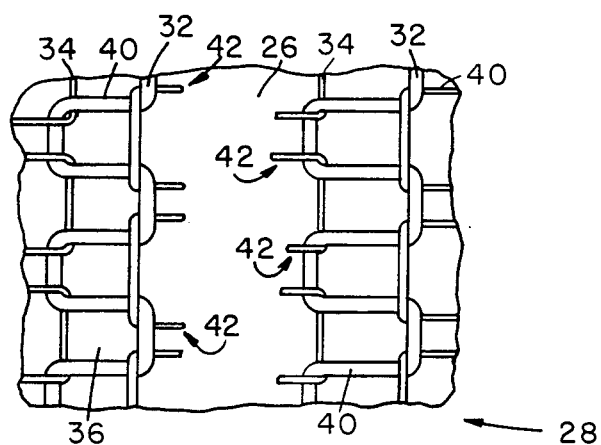
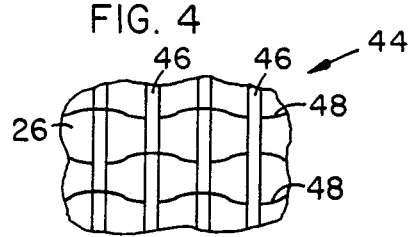
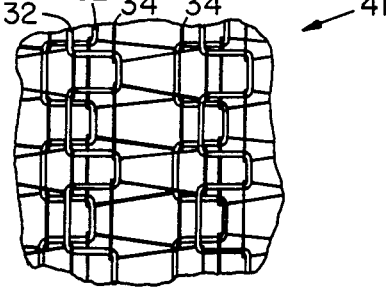

SAFETY HOSE

BACKGROUND OF THE INVENTION

The invention relates to a safety component for automobiles, but more particularly, the invention relates to a hose that interconnects a fuel line to a fuel tank. Such hose usually has an elastomeric tube and cover that sandwich a twined textile reinforcement that may be in the form of a knit, braid, or spiral. The hose may be coupled to the tank and fill line by means of clamps.

In some instances of automobile impact, where the fuel fill line and fuel tank are displaced relative to each other, interconnecting hose may be pulled apart or pulled from its coupled position and result in a fuel spill. This invention is directed to a hose construction that reduces the likelihood of the hose being pulled apart or pulled from its coupled position when an automobile's fuel line and fuel tank are displaced.

SUMMARY OF THE INVENTION

In accordance with the invention, a hose has an elastomeric tube encircled by a twined reinforcement that provides a circumferential component of reinforcement and a longitudinal component of reinforcement. An elastomeric cover encircles the tube and reinforcement.

A cumulative tensile strength of the longitudinal reinforcement component is substantially less than a cumulative tensile strength of the circumferential reinforcement component such that a portion of the twined reinforcement breaks and permits substantial elongation of the hose without tube rupture when the hose is longitudinally pulled. Controlled breaking of portions of the twined reinforcement permits elongation of the hose so that a fuel tank may be displaced relative to a fill line with less likelihood of pulling the hose apart or pulling the hose from its coupled position.

Other aspects of the invention will be apparent after reviewing the drawings and description thereof wherein:

FIG. 1 is illustrative of an automobile that uses the hose of the invention;

FIG. 2 is a broken away and expanded view taken generally along the line 2—2 of FIG. 1 showing how hose of the invention interconnects a fuel tank and fuel fill lines;

FIG. 3 is a partially cut away and cross sectional view showing an enlarged portion of an interconnecting hose of FIG. 2;

FIG. 4 is an enlarged partial view taken along the line 4—4 of FIG. 3 and showing a twined reinforcement;

FIG. 5 is a view similar to FIG. 4 showing how a portion of a twined reinforcement breaks when the hose is longitudinally stretched; and FIG. 6 is a partial view that is similar to FIG. 4 but showing an alternate twined reinforcement.

FIG. 7 is a view similar to FIG. 4 and shows an alternate form of a twined reinforcement.

DESCRIPTION OF PREFERRED EMBODIMENT

Referring to the Figures, and automobile 10 has a gas cap 12 that closes a fuel fill line 14 that is interconnected by one or more hoses 16, 18, to a fuel tank 20. Two hoses are often used when the fuel line 14 also includes and interconnected vent line 22. The hoses are coupled to the fuel fill line and fuel tank by means such as clamps 24. The construction of the hoses 16, 18, of the invention is such to reduce the likelihood of the hose being pulled apart or pulled from its coupled position when the tank or fill line are displaced relative to each other such as may occur in the event of an automobile crash.

Referring more particularly to FIGS. 3 and 4, the hose of the invention has an elastomeric tube 26 that is encircled by the twined reinforcement 28. An elastomeric cover 30 encircles a twined reinforcement and tube.

The tube is made of any suitable elastomeric material, such as a synthetic rubber or blends thereof, which are compatable with petro-chemical fuels. The tube and cover have sufficient elastomeric properties such that they may be stretched up to 125%, more preferably 150%, and most preferably up to 200% of their length without tearing.

The reinforcement is twined from any suitable textile yarn such as rayon, nylon, aramid, nomex, polyester or the like, to substantially inhibit radial and longitudinal growth of the hose under expected fuel tank pressures. Radial growth is inhibited by a circumferential component of the reinforcement and longitudinal growth is inhibited by a longitudinal component of the reinforcement. The cumulative tensile strength of the longitudinal components is substantially less than the cumulative tensile strength of the circumferential components, such that portions of yarn forming the longitudinal reinforcement components break and permit substantial elongation of the hose without tube rupture when the hose is longitudinally stretched as by displacement of the fuel line from the fuel tank.

In a preferred embodiment, the difference between the cumulative tensile strength of the circumferential and longitudinal reinforcement component is achieved by means of a knitted reinforcement that encircles the tube. Intermittent leads of a first yarn 32 and a second, tensionally weaker yarn 34 are alternately knitted together with knit stitched loops 36 that each have a helically oriented component 38 at some helical angle A, and a longitudinally oriented component 40. In the illustrative embodiment of FIGS. 3-4, a single knit stitch is shown. Intermittent leads are achieved by alternating every other yarn spool of a knitter with the first and second yarns.

More complicated twining stitches may be used such as a lock stitch knit 41 as illustrated by FIG. 6. In the case of a lock stitch knit, alternate knitting together of the first and second yarns by intermittent leads is achieved by alternating two successive spools of the first yarn and two successive spools of the second yarn of a knitter. The resulting knit has a cumulative tensile strength in the longitudinal direction that is substantially less than a cumulative tensile strength in the circumferential direction because of the tensionally weaker second yarn.

As an example, a hose is constructed with a 1.25 inch inside diameter tube having a 0.11 inch wall thickness. The tube is made of nitrile (NBR) rubber that exhibits an ultimate tensile of 175° psi with an ultimate elongation of 400 percent. A lock stitch knit reinforcement encircles the tube and is made with intermittent leads of 21 pound tensile polyester yarn and 6 pound tensile nylon yarn. A 0.06 inch cover encircles the tube and knitted reinforcement. The cover is made of chlorinated polyethylene and has a tensile strength of 1900 psi and an ultimate elongation of 235 percent. The example hose exhibits substantially little radial growth and longitudinal elongation when subjected to expected fuel tank pressures and exhibited a minimum burst of 97 psi.

In use, the example hose is interconnected between a fuel fill line and a fuel fill tank. The hose is coupled with band type clamps. As the fuel line is displaced relative to the fuel tank, the hose is tensioned, which causes a plurality of the longitudinal components of the tensionally weaker second yarn to break 42 and allow the tube and cover to be stretched as much as 150%, and more preferrably as much as 200% without rupture. The broken yarn weakens the tensile strength of the hose and inhibits it from being pulled from its coupled position.

ADDITIONAL EMBODIMENT

Referring to FIG. 7, an alternate twined reinforcement is disclosed. The reinforcement is in the form of woven tire cord 44 which has yarn cord 46 positioned in parallel fashion by light weight pick yarn 48. The yarn cords are oriented substantially circumferentially and provide a circumferential reinforcement component. The weaker pick yarns are longitudinally oriented and provide a longitudinally oriented component. The pick yarns break when the hose is longitudinally stretched.

The foregoing detailed description is made for purpose of illustration only and it is not intended to limit the scope of the invention, which is to be determined from the appended claim.

What is claimed is:

1. In a hose of the type having an elastomeric tube, a twined reinforcement encircling the tube and an elastomeric cover encircling the tube and reinforcement, the improvement comprising:
   a knit reinforcement comprising intermittent leads of a first yarn and a second, tensionally weaker yarn alternatively knitted together with knit stitched loops that each have a helically oriented component and a longitudinally oriented component in relation to the tube and wherein a cumulative tensile strength of the longitudinally oriented loop components is substantially less than a cumulative tensile strength of the helically oriented loop components such that some of the loops of the second yarn define a means to break and permit substantial elongation of the hose without tube rupture.

2. The hose as claimed in claim 1 wherein the tensile strength of the first yarn is at least 3.5 times the strength of the second yarn.

3. The hose as claimed in claim 2 wherein the tensile strength of the second yarn is about 6 pounds and the tensile strength of the first yarn is about 21 pounds.

4. The hose as claimed in claim 1 wherein the hose may be elongated at least 150% of its length without tube rupture when the hose is longitudinally pulled.

5. The hose as claimed in claim 1 wherein the hose may be elongated at least 200% of its length without tube rupture when the hose is longitudinally pulled.

6. In a hose of the type having an elastomeric tube, a twined reinforcement encircling the tube and an elastomeric cover encircling the tube and reinforcement, the improvement comprising:
   a twined textile reinforcement having a circumferentially oriented reinforcement component and a longitudinally oriented reinforcement component wherein a cumulative tensile strength of the longitudinally oriented component is substantially less than a cumulative tensile strength of the helically oriented component such that parts of the reinforcement of the longitudinally oriented component define a means to break and permit substantial elongation of the hose without tube rupture.

* * * * *